United States Patent [19]
Burr

[11] Patent Number: 6,031,643
[45] Date of Patent: *Feb. 29, 2000

[54] METHOD FOR HOLOGRAPHIC STORAGE

[75] Inventor: Geoffrey William Burr, Cupertino, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/889,544

[22] Filed: Jul. 8, 1997

[51] Int. Cl.$^7$ .............................. G03H 1/02; G03H 1/12; G03H 1/26

[52] U.S. Cl. .................................. 359/28; 359/7; 359/11; 359/22

[58] Field of Search .................................. 359/10, 22, 24, 359/28, 25, 11

[56] References Cited

U.S. PATENT DOCUMENTS

| | | | |
|---|---|---|---|
| 4,655,542 | 4/1987 | Dube | 350/3.64 |
| 5,313,320 | 5/1994 | Kornfield et al. | 359/76 |
| 5,511,058 | 4/1996 | Visel et al. | 369/103 |
| 5,561,287 | 10/1996 | Turner et al. | 250/208.2 |
| 5,638,193 | 6/1997 | Trisnadi et al. | 359/10 |
| 5,694,488 | 12/1997 | Hartmann | 382/210 |

OTHER PUBLICATIONS

G. W. Burr et al., "Modulation Coding for Pixel–matched Holographic Data Storage", *Optics Letters*, vol. 22, No. 9, May 1, 1997, pp. 639–641.

S. Campbell et al., "Absorption Effects in Photorefractive Volume–holographic Memory Systems", Part I, Beam Depletion, *Journal of the Optical Society of America*, vol. 13, No. 10, Oct. 1996, pp. 2209–2217.

I. Çokgör et al., "Multilayer Disk Recording Using 2–photon Absorption and the Numerical Simulation of the Recording Process", *1997 Optical Data Storage Conference Digest*, Apr. 7–9, 1997, pp. 54–59.

J. P. Huignard et al., "Coherent Selective Erasure of Superimposed Volume Holograms in $LiNbO_3$", *Applied Physics Letters*, vol. 26, No. 5, Mar. 1, 1975, pp. 256–258.

H. Sasaki et al., "Gray–scale Fidelity in Volume–multiplexed Photorefractive Memory", *Optics Letters*, vol. 18, No. 16, Aug. 15, 1993, pp. 1358–1360.

*Primary Examiner*—Cassandra Spyrou
*Assistant Examiner*—Jared Treas
*Attorney, Agent, or Firm*—Robert B. Martin; Thomas R. Martin

[57] ABSTRACT

The present invention is a method for optical data storage which enhances the contrast between ON and OFF pixels. The method comprises writing a two-dimensional image comprising a plurality of pixels into a recording medium with the exposure of individual ON pixels during the recording of the image. The ON pixels are then switched off and OFF pixels are switched on, and the phase of either the object beam or reference beam is changed. The process results in subtraction of residual signal from the OFF pixels.

10 Claims, 2 Drawing Sheets

METHOD FOR HOLOGRAPHIC STORAGE

This invention was made with government support under agreement number MDA972-94-2-0008 (ARPA Order No. A576) awarded by the Advanced Research Projects Agency. The government has certain rights in this invention.

TECHNICAL FIELD

The present invention relates to an improved method for optical data storage, and in particular to a method for holographic data storage which enhances the contrast between ON and OFF pixels.

BACKGROUND OF THE INVENTION

In holographic recording, a light beam from a coherent monochromatic source (usually a laser) is split into two parts. One part of the beam (the object beam) is passed through a spatial light modulator (SLM) and then into a recording medium. A suitable SLM is a planar liquid crystal array having a plurality (e.g., 1024×1024) of individual liquid crystal panels. Each crystal panel has a transmissive state and a nontransmissive state. During the recording of a single two-dimensional image, some of the panels are in their transmissive (ON) state and some are in their nontransmissive (OFF) state. The other unmodulated portion of the beam strikes the recording medium directly (reference beam). The object beam and reference beam intersect in the recording medium to form a complex interference pattern which is recorded in the medium. After a data page has been recorded in the recording medium, the reference beam angle is changed and the next data page is recorded. In the reconstruction (readout) step, the reference beam alone strikes the recording medium and is diffracted by the recording medium to form a faithful copy of the original object beam. The diffracted beam is directed to a suitable detector, such as a charge-coupled device (CCD) detector array, which reads each pixel in the data page.

Unfortunately, during the readout process, errors may occur due to the lack of contrast between ON and OFF pixels. The lack of contrast is due to random noise and deterministic variations. Random noise is caused by camera noise, crosstalk from other holograms, and fidelity loss during recording.

Deterministic variations are the same from data page to data page and are caused by nonuniformities in the object beam before its modulation, dust and other imperfections in the optics, nonuniform pixel response in the SLM or CCD, interpixel crosstalk, and absorption effects in the photosensitive crystal. Deterministic variations cause some ON pixels in the reconstructed data pages to be repeatably weaker than other ON pixels. Further, defects or imperfections in the nontransmissive state of the SLM can cause some OFF pixels to record a weak signal. The lack of contrast between ON and OFF pixels can result in errors during readout.

An intuitive response to this problem would be to increase the recording time of each data page so that all ON pixels get brighter, thereby enhancing the contrast between ON and OFF pixels. Unfortunately, stored holograms are slowly erased during the recording process of a new hologram and increasing the recording time for each page merely exacerbates the erasure problem. Further, increasing recording time for each page also increases crosstalk from bright ON pixels into adjacent OFF pixels. There is still a need in the art for a recording method for enhancing the contrast between ON and OFF pixels.

It is therefore an object of the present invention to provide an improved method for optical data storage.

Other objects and advantages will become apparent from the following disclosure.

SUMMARY OF THE INVENTION

The present invention relates to a method for data storage which enhances the contrast between ON and OFF pixels. The method of the present invention involves recording a single image comprising a plurality of bits using a storage device comprising an optical recording medium and a plurality of coherent light sources, preferably lasers, each having an ON and OFF state for recording individual bits in the medium. The storage device also has means for changing the relative phase between the light beams generated by the light sources. Preferably, the storage device also has a lens position between the light sources and the medium to focus the individual light beams into the medium. The method comprises the steps of: (i) writing in the recording medium a single image with a plurality of light sources in the ON state (plurality of bits simultaneously); (ii) switching all of the light sources to their other state (e.g., from ON to OFF or OFF to ON); and (iii) changing the phase of light beams striking the recording medium and continue irradiation of the recording medium for a short period of time. The process results in subtracting any residual signal from the OFF pixels to reduce their signal to a very low value during readout, thereby enhancing the contrast between the OFF and ON pixels. Preferably, the method of the present invention involves holographic storage. In holographic storage, the individual light sources are in a spatial light modulator, preferably a liquid crystal array illuminated by a laser.

A more thorough disclosure of the present invention is presented in the detailed description which follows and the accompanying drawing.

DETAILED DESCRIPTION OF THE INVENTION

Figure 1:
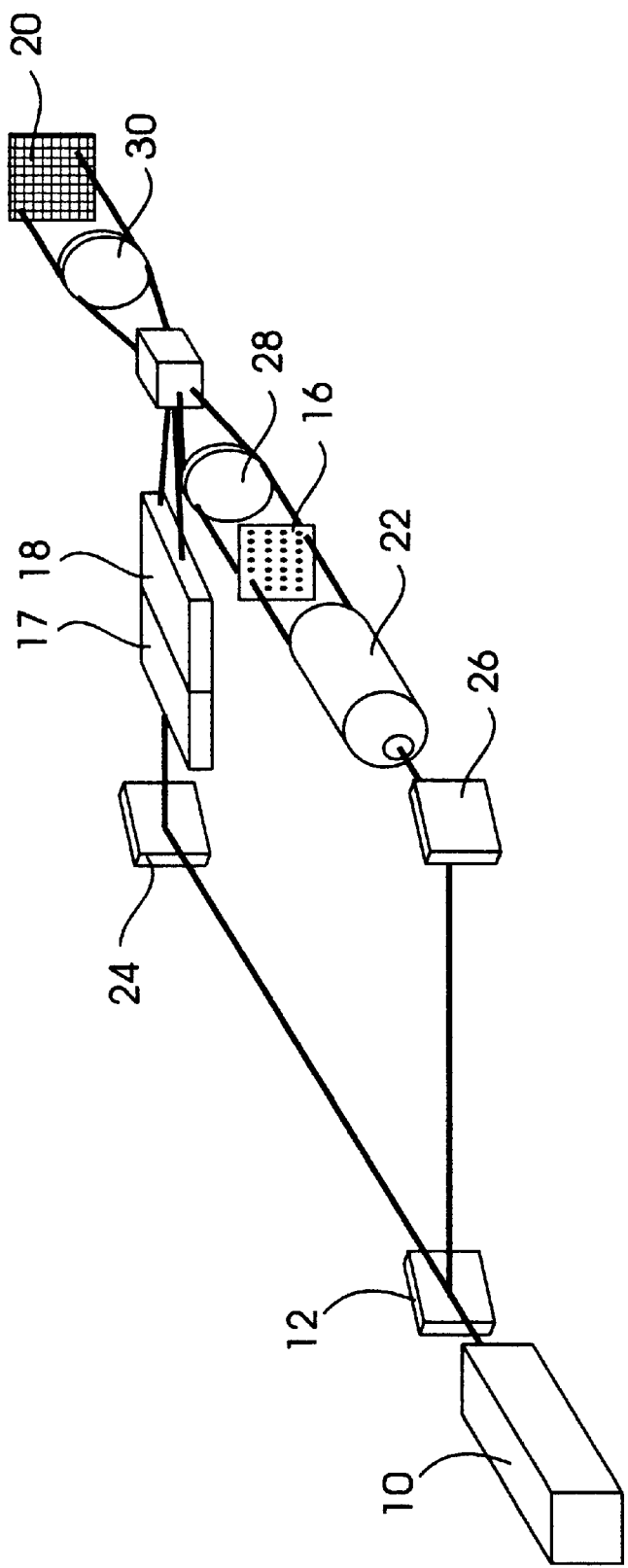
FIG. 1 is a view of a storage device of the present invention.

The present invention relates to a method for optical data storage which enhances the contrast between ON and OFF pixels. Preferably, the method relates to holographic data storage. Referring to FIG. 1, there is shown a storage device for use in the method of the present invention generally comprising a laser 10 for providing a beam of coherent radiation, a beam splitter 12 for splitting the laser beam into an object and a reference beam, a photosensitive storage medium 14, and a spatial light modulator 16. The storage device also generally comprises beam-steering optics 17 and phase-changing optics 18 to change the angle and/or phase of the reference beam and CCD detector 20. The device also comprises beam expander 22, mirrors 24 and 26, and lenses 28 and 30.

Suitable sources of coherent monochromatic radiation are lower power, continuous-wave lasers such as solid state diode lasers, argon lasers, Ti sapphire, Nd:YAG lasers, and repetitively Q-switched lasers.

Suitable beam splitters are polarizing or nonpolarizing cube beam splitters in conjunction with waveplates for polarization control.

Suitable photosensitive recording media are: (i) photochromic materials such as dichromated gelatin, photodimers such as anthracene, polymerizable materials such as disclosed in U.S. Pat. No. 5,013,632, and materials which isomerize such as stilbenes, and (ii) photorefractive materials such as a single photorefractive crystal and preferably a ferroelectric photorefractive crystal. As used herein, the term "ferroelectric" refers to crystals exhibiting an electric dipole moment even in the absence of an external electric field. Suitable photorefractive media are lithium niobate, potassium lithium niobate, lithium tantalate, barium titanate, strontium barium niobate (SBN), lead barium niobate (PBN), barium strontium potassium sodium niobate (BSKNN), potassium tantalate niobate, bismuth silicate, and bismuth germanate. Preferred ferroelectric host media are lithium niobate, lithium tantalate, barium titanate, and SBN. Other suitable host media will be known to those skilled in the art. Preferably, the medium is doped with a transition metal (e.g., iron) or a rare earth metal, such as praseodymium, to increase photosensitivity.

The dopants are generally doped into the ferroelectric medium by art-known processes. The doped ferroelectric crystals of this invention may also be purchased from vendors such as Virgo Optics of Port Richey, Fla.; Deltronic Crystal Industries, Inc., of Dover, N.J.; CSK Optronics of Culver City, Calif.; and JTT International of Orlando, Fla.

Suitable spatial light modulators are liquid crystal modulators and micromechanical reflection modulators. The structure and operation of such modulators are disclosed by K. Schwartz in "The Physics of Optical Recording", Springer-Verlag, 1993, which is incorporated herein by reference for all purposes. Suitable phase-changing optics include a piezoelectric mirror, an electro-optic modulator, or acousto-optic modulator. The operational parameters for holographic storage and components for holographic storage devices are well known in the art for crystalline photorefractive materials such as disclosed in Collier et al., "Optical Holography", Chapter 16, Academic Press, 1991, the disclosure of which is incorporated herein by reference for all purposes.

The first step of a holographic process of the present invention involves generating a beam of coherent electromagnetic radiation (e.g., from a laser), preferably monochromatic. The second step involves splitting that beam of coherent radiation into an object and reference beam. The third step of the process involves directing the object beam to a spatial light modulator to modulate the object beam.

The spatial light modulator functions to modulate the object beam to correspond to a two-dimensional image comprising a plurality of pixels (bits) which is to be recorded in the recording medium. The spatial light modulator comprises a plurality of individual modulating elements, each having at least a first state which allows the beam of radiation incident on the element to strike the recording medium and a second state which prohibits at least a portion of the incident beam of radiation from striking the recording medium. Preferably, the spatial light modulator is a liquid crystal array where, in one embodiment, the individual elements are individual liquid crystal panels, each having at least a first state which is transmissive to the incident radiation and a second state which is nontransmissive. Each panel is a liquid crystal cell comprising a liquid crystalline material sandwiched between two electrodes and two polarizers which are rotated (e.g., 90 degrees) with respect to each other. During the process step for modulating the object beam to record a single two-dimensional image (e.g., generally less than 1 second), the ON elements of the spatial light modulator are in their transmissive state and the OFF elements are in their nontransmissive state. The fourth step of the process involves intersecting the modulated object beam which has passed through the SLM and the reference beam in the recording medium to record the image. A plurality of mirrors can be utilized to direct the beams to the medium.

After the image has been recorded in the medium, the fifth step of the process involves switching elements of the modulator from one state to their other state (e.g., all of the transmissive to nontransmissive and at least some of the nontransmissive to transmissive). The sixth step of the process involves changing the phase of the object beam or the reference beam. For example, in changing the phase of the object beam in the sixth step, the radiation passing through the transmissive panels (which were switched from nontransmissive in the fifth step) should be about 180° phase shifted (or 180°+a multiple of 2 $\pi$) from the radiation which passed through the transmissive panels in step three. However, due to the operation of the modulator, there may already be a phase shift between radiation passing through the ON and the defective OFF elements. In this case, the desired induced phase shift in the sixth step of the process should be 180 degrees ($\pi$)–(phase shift difference between the ON and OFF elements). The portions of the hologram recorded by the OFF pixels during step three will now be removed by turning those pixels ON during step six with the phase of the ON pixels in step six being 180° phase shifted from the phase in step three.

The inherent phase shift between the ON and OFF elements can be determined with an interferometer. Alternatively, to determine the desired phase shift, a number of holograms can be recorded using the method of the present invention with a large number of OFF pixels, varying the induced phase shift systematically to determine the minimum brightness point for the OFF pixels.

The seventh and last step of the process involves intersecting the phase-shifted object and reference beam in the recording medium. The last step of the process results in subtracting residual signal from the OFF elements to reduce their signal to a very low value during readout, thereby enhancing the contrast between the ON and OFF elements.

After the single two-dimensional image has been recorded in the medium and the residual signal has been subtracted from OFF pixels, the storage device is modified to enable the recording of another two-dimensional image in the medium. The recording device can be modified by changing the angle of the reference beam (e.g., with a galvanometer scanner or acoustic optic beam deflector) or the wavelength of the reference beam. After changing the angle of the reference beam, the next two-dimensional image is recorded in the recording medium.

In an alternative embodiment of the present invention, the liquid crystal panels have more than two states where one or more intermediate states are partially transmissive, e.g., they allow only a portion of the radiation incident on the panel to intersect the recording medium. These panels can be utilized to provide gray-scale subtraction of OFF elements during the subtraction process. The ON panels can be set to an intermediate state during the subtraction process to vary the amount of light incident on the panel, thereby subtracting more from the brighter OFF elements.

The recorded two-dimensional image is read from the medium with a monochromatic read beam suitably having a wavelength equal to the recording beam. The light from the reading beam is diffracted by the medium. The diffracted beam then conveniently passes through a lens to produce a two-dimensional image which is captured by a detector array such as a charge-coupled device (CCD). Output from the detector array can be converted into a serial binary form suitable to input into standard computer central processing units.

The process of the present invention subtracts (erases) from "OFF" pixels during the recording process so that the readout of the image has greater contrast between ON and OFF elements. Therefore, more holograms can be superimposed before the signal-to-noise ratio falls below an acceptable level. Further, since a smaller contrast can be tolerated in the SLM, the cost of this component is reduced.

In another alternative embodiment of the invention the recording medium can be moved a short distance (½ of a grating) of the residual image stored in the OFF pixels during step 3. The distance and direction of movement orthogonal to the grating vector can be calculated by dividing the grating pitch inside the material by 2 times the cosine of the angle between the grating vector and the direction of crystal movement. This movement should be typically less than 200 nm, depending on grating pitch. In this embodiment the phase of the incident beams is not changed for the second exposure.

The following example is detailed descriptions of the process of the present invention. The detailed preparation falls within the scope of, and serves to exemplify, the more generally described methods set forth above. The example is presented for illustrative purposes only, and is not intended as a restriction on the scope of the invention.

EXAMPLE

The method of the invention was demonstrated on the DEMON holographic storage demonstrator described in *Laser Focus World* 81 (November 1996). The DEMON had an argon 514.5 nm laser which was routed to the system via fiber, and split into the object and reference paths. The object beam was expanded to overfill the input aperture of the SLM, sacrificing power for beam uniformity. The SLM was an Epson 640×480 transmissive liquid crystal panel with 42 μm pixel spacing and 41% areal fill factor. The spatially modulated beam was demagnified by a custom 5-element zoom lens, forming a pixel-matched image in the zoom lens output plane. This plane coincided with the input plane of a folded 4-F system, with two Fourier transform lenses of 89 mm focal length. The CCD camera was a Pulnix TM6701AN with a 640×480 Kodak KAI-0310M CCD chip running at 60 frames per second. The CCD pixels were on a 9 μm grid. Since the zoom lens was not designed for magnifications over 3.0, the 42 μm spacing of the SLM was demagnified to an 18 μm grid and only the center 320×240 pixels of the SLM were seen by the camera. Since each incoming SLM pixel image was centered on a single CCD pixel, there was no oversampling or postprocessing. The Pulnix camera was used as if it were a 320×240 pixel camera with 18 μm spacing and 15% areal fill factor. The camera and SLM each had two New Focus Picomotor stages for registration of the pixel grids. These allowed alignment either of the SLM to the CCD, or of the CCD to a stored hologram, and were needed only periodically depending on changes in ambient temperature. An acousto-optic modulator (AOM) at the fiber input reduced the incident flux during object beam alignment.

In this system, the Fourier transform plane was positioned 2–3 cm behind the square exit face of the 8 mm×15 mm LiNbO$_3$ (0.02% Fe) crystal, and an aperture placed to pass only the central nine orders of the Fourier spectrum (0.81 cm$^2$). With this large aperture, the point-spread function was narrow and interpixel crosstalk negligible. A Cambridge Instruments 602HC-6650 galvanometric mirror positioner (1.5 msec settling time, 1.5 μrad repeatability) was used to deflect the reference beam for angle multiplexing.

A low-contrast SLM was approximated by placing a half-waveplate immediately after the SLM. By rotating the waveplate, a suitably poor contrast ratio could be obtained.

The phase shift was induced by a stage under the crystal, driven by two NewFocus picomotor screws. Although the smallest resolution step possible with the picomotors is approximately 400 nm (already more than one half the operating wavelength of 514.5 nm), the size of a step in the forward and reverse directions are repeatably different by approximately 10–15 nm. By careful calibration, repeatable phase shifts of 180 degrees could be induced by stepping approximately 18 steps forward, followed by 18 steps in reverse. This condition was calibrated by recording holograms in two equal-time exposures separated by the forward-reverse movement of the picomotors. The large area contrast between a region of pixels written during only one of the exposures and a region written during both was approximately 10:1.

To demonstrate the invention, a two-part exposure was again used to record a high-contrast data pattern using the effectively low-contrast SLM. The first of "positive" part of the exposure consisted of driving the "1" pixels with the SLM pixels ON, and the "0" pixels with the SLM pixels OFF. After the 180-degree phase shift, the second part of the recording sequence consisted of all pixels being driven OFF. In this way, the exact phase shift between ON and OFF states did not need to be measured.

Figure 2A:
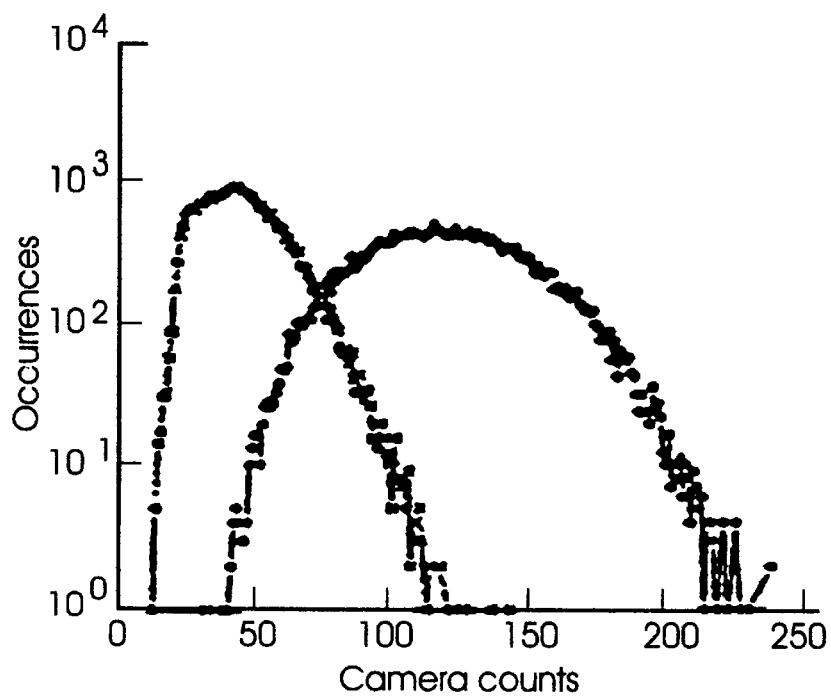
FIG. 2 is a histogram of uncorrected and corrected holograms.
Figure 2B:
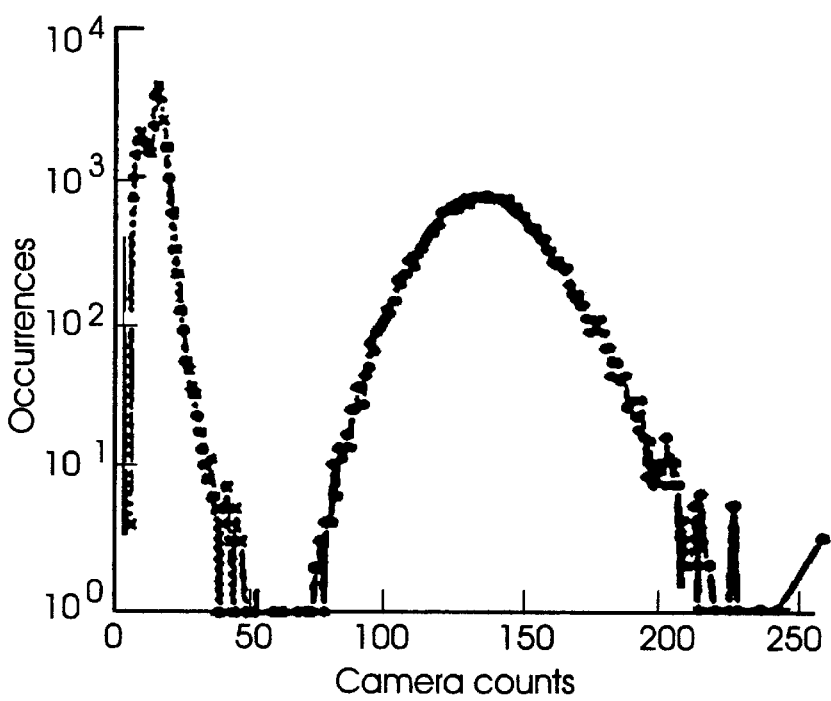

FIGS. 2A–2B show the histogram of the uncorrected (a) and corrected holograms (b). The signal-to-noise ratio $$SNR = \frac{\mu_{ON} - \mu_{OFF}}{\sqrt{\sigma_{ON}^2 + \sigma_{OFF}^2}}$$

is calculated from the camera count values, and the bit-error rates are extrapolations asuming the use of the balanced block 6:8 code developed by the IBM Holographic Optical Storage Team [Reference: *Optics Letters*, Vol. 22, May 1, 1997, page 639]. The uncorrected histogram had SNR of 2.28 and an estimated probability of error ($P_e$) of $1.1 \times 10^{-2}$ and the corrected histogram had SNR of 6.13 and an estimated $P_e$ of $2.2 \times 10^{-8}$.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention as described in the following claims.

What is claimed is:

1. A method for recording in a holographic storage device an interference pattern representing a single data page having a two-dimensional pattern of pixels, the data storage device comprising (i) a laser for generating coherent radiation, (ii) a beam splitter for splitting the beam of coherent radiation into a reference beam and an object beam, (iii) a recording medium, (iv) a spatial light modulator for receiving the data page to be recorded and comprising a plurality of individual modulating elements for generating bright and dark pixels, each element having a first state which allows at least a portion of the object beam of radiation incident on the element to strike the recording medium to record a bright pixel and a second state which substantially prevents the incident object beam of radiation from striking the recording medium to record a dark pixel, and (v) a detector for detecting the recorded interference pattern as a data page having a two-dimensional pattern of bright and dark pixels when the recorded interference pattern is illuminated by the reference beam, and wherein some of the detected bright pixels have insufficient contrast relative to some of the detected dark pixels as a result of the incident object beam not being completely prevented from striking the recording medium by the modulating elements in the second state, the method comprising the steps of:

(a) generating a beam of coherent radiation;

(b) splitting the beam of coherent radiation into a reference beam and an object beam;

(c) directing the object beam to a spatial light modulator that has received the single data page to modulate the object beam where some of the elements of the modulator are in the first state for transmitting bright pixels to the recording medium and the remainder of the elements are in the second state for transmitting dark pixels to the recording medium;

(d) intersecting the object beam and reference beam in the recording medium to record the interference pattern representing the single data page;

(e) switching all of the elements of the modulator that were in the first state in step (c) to the second state;

(f) changing the phase of the entire object beam or the entire reference beam incident on the medium; and (g) intersecting the object beam and reference beam in the recording medium to thereby enhance the contrast between the bright and dark pixels detected by the detector when the interference pattern representing said single data page recorded in step (d) is illuminated by the reference beam.

2. The method of claim 1 wherein the recording medium is a photorefractive crystal.

3. The method of claim 2 wherein the crystal is doped with a rare earth element.

4. The method of claim 2 wherein the spatial light modulator is a liquid crystal modulator or a micromechanical reflection modulator.

5. The method of claim 4 wherein the laser is a diode laser.

6. A method for recording in a holographic storage device an interference pattern representing a single data page having a two-dimensional pattern of pixels, the data storage device comprising (i) a laser for generating coherent radiation, (ii) a beam splitter for splitting the beam of coherent radiation into a reference beam and an object beam, (iii) a recording medium, (iv) a spatial light modulator for receiving the data page to be recorded and comprising a plurality of individual modulating elements for generating bright and dark pixels, each element having a first state which allows at least a portion of the object beam of radiation incident on the element to strike the recording medium to record a bright pixel and a second state which substantially prevents the incident object beam of radiation from striking the recording medium to record a dark pixel, and (v) a detector for detecting the recorded interference pattern as a data page having a two-dimensional pattern of bright and dark pixels when the recorded interference pattern is illuminated by the reference beam, and wherein some of the detected bright pixels have insufficient contrast relative to some of the detected dark pixels as a result of the incident object beam not being completely prevented from striking the recording medium by the modulating elements in the second state, the method comprising the steps of:

(a) generating a beam of coherent radiation;

(b) splitting the beam of coherent radiation into a reference beam and an object beam;

(c) directing the object beam to a spatial light modulator that has received the single data page to modulate the object beam where some of the elements of the modulator are in the first state for transmitting bright pixels to the recording medium and the remainder of the elements are in the second state for transmitting dark pixels to the recording medium;

(d) intersecting the object beam and reference beam in the recording medium to store an interference pattern representing the single data page, the interference pattern having a grating pitch;

(e) switching all of the elements of the modulator that were in the first state in step (c) to the second state;

(f) moving the recording medium a distance of one-half of the grating pitch of the interference pattern stored in step (d); and (g) intersecting the object beam and reference beam in the recording medium after the recording medium has been moved in step (f) to complete the recording of the interference pattern representing said single data page; whereby the contrast between the bright and dark pixels detected by the detector when the recorded interference pattern is illuminated by the reference beam is enhanced.

7. The method of claim 6 wherein the recording medium is a photorefractive crystal.

8. The method of claim 7 wherein the crystal is doped with a rare earth element.

9. The method of claim 7 wherein the spatial light modulator is a liquid crystal modulator or a micromechanical reflection modulator.

10. The method of claim 9 wherein the laser is a diode laser.

* * * * *